(12) United States Patent
Shiraishi et al.

(10) Patent No.: US 11,599,867 B2
(45) Date of Patent: Mar. 7, 2023

(54) IMAGE IDENTIFICATION REGISTER APPARATUS, IMAGE IDENTIFICATION REGISTER SYSTEM, CHECKOUT PROCESSING METHOD, AND PROGRAM

(71) Applicant: NEC CORPORATION, Tokyo (JP)

(72) Inventors: Soma Shiraishi, Tokyo (JP); Kota Iwamoto, Tokyo (JP); Hideo Yokoi, Tokyo (JP); Tsugunori Takata, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/977,127

(22) PCT Filed: Mar. 2, 2018

(86) PCT No.: PCT/JP2018/008109
§ 371 (c)(1),
(2) Date: Sep. 1, 2020

(87) PCT Pub. No.: WO2019/167272
PCT Pub. Date: Sep. 6, 2019

(65) Prior Publication Data
US 2021/0049574 A1 Feb. 18, 2021

(51) Int. Cl.
*G06Q 20/20* (2012.01)
*G07G 1/12* (2006.01)
*G06V 10/40* (2022.01)

(52) U.S. Cl.
CPC ......... *G06Q 20/208* (2013.01); *G06Q 20/204* (2013.01); *G06Q 20/206* (2013.01); *G06V 10/40* (2022.01); *G07G 1/12* (2013.01)

(58) Field of Classification Search
CPC .. G06Q 20/208; G06Q 20/204; G06Q 20/206; G06K 9/46; G07G 1/12
See application file for complete search history.

(56) References Cited

U.S. PATENT DOCUMENTS 9,367,203 B1 * 6/2016 Costello ............... G06F 1/1686
2010/0158310 A1 6/2010 McQueen et al.
(Continued)

FOREIGN PATENT DOCUMENTS

JP 2007-305039 A 11/2007
JP 2007305039 A * 11/2007
(Continued)

OTHER PUBLICATIONS

International Search Report of PCT/JP2018/008109 dated May 15, 2018 [PCT/ISA/210].
(Continued)

*Primary Examiner* — A. Hunter Wilder
*Assistant Examiner* — Joseph M Mutschler
(74) *Attorney, Agent, or Firm* — Sughrue Mion, PLLC

(57) ABSTRACT

An image identification register system (1) includes an image identification register apparatus (10), an image capturing apparatus (30), and a touch panel display (40). The touch panel display (40) is also used as a placement surface of a product. The image capturing apparatus (30) captures a product (P) placed on the touch panel display (40), and generates an image of the product (P). The image identification register apparatus (10) includes an image acquisition unit (110) that acquires an image of the product (P) placed on the touch panel display (40), a product identification unit (120) that identifies the product captured in the image, a display control unit (130) that causes a user interface that receives an input needed for checkout processing of the product to be displayed on the touch panel display according to an identification result of the product, and a processing execution unit (140) that executes processing based on an input to the user interface.

12 Claims, 20 Drawing Sheets

(56) References Cited

U.S. PATENT DOCUMENTS

| | | |
|---|---|---|
| 2013/0182899 A1 | 7/2013 | Naito et al. |
| 2016/0234356 A1* | 8/2016 | Thomas ................ H04K 3/84 |
| 2017/0017944 A1* | 1/2017 | Sasahara ............ G06Q 20/201 |
| 2017/0243317 A1* | 8/2017 | Rodriguez ............ G06K 9/627 |

FOREIGN PATENT DOCUMENTS

| | | | | |
|---|---|---|---|---|
| JP | 2009-163330 A | | 7/2009 | |
| JP | 2009-163331 A | | 7/2009 | |
| JP | 2009163330 A | * | 7/2009 | |
| JP | 2010-049429 A | | 3/2010 | |
| JP | 2010049429 A | * | 3/2010 | |
| JP | 2013-008103 A | | 1/2013 | |
| JP | 2013-145526 A | | 7/2013 | |
| JP | 2013145526 A | * | 7/2013 | ........... G06K 9/6201 |
| JP | 2013-186875 A | | 9/2013 | |
| JP | 2013186875 A | * | 9/2013 | |
| JP | 2016-110480 A | | 6/2016 | |
| JP | 2017-062703 A | | 3/2017 | |
| WO | 2017/126253 A1 | | 7/2017 | |

OTHER PUBLICATIONS

Japanese Office Communication for JP Application No. 2020-503243 dated Dec. 7, 2021 with English Translation.

* cited by examiner

FIG. 20

| TRACK TEMPLATE | PROCESSING THAT NEEDS TO BE EXECUTED |
|---|---|
| ·····(CIRCLE) | REGISTER PRODUCT |
| ·····(X SIGN) | CANCEL PRODUCT |
| ·····(TRIANGLE) | CORRECT IDENTIFICATION RESULT |
| ·····(SQUARE) | PROCEED TO CHECKOUT PROCESSING |
| ⋮ | ⋮ |

IMAGE IDENTIFICATION REGISTER APPARATUS, IMAGE IDENTIFICATION REGISTER SYSTEM, CHECKOUT PROCESSING METHOD, AND PROGRAM

CROSS REFERENCE TO RELATED APPLICATIONS

This application is a National Stage of International Application No. PCT/JP2018/008109, filed Mar. 2, 2018.

TECHNICAL FIELD

The present invention relates to a technique for assisting with work at a store.

Background Art

PTL 1 described below discloses a technique in which a processing apparatus recognizes a product present on a placement pedestal by using an image generated by an image capturing apparatus facing toward the placement pedestal of the product, and a projection apparatus projects an image related to checkout processing on the recognized product and/or a placement surface of the placement pedestal.

CITATION LIST

Patent Literature

[PTL 1] International Publication No. WO2017/126253

SUMMARY OF INVENTION

Technical Problem

The present inventor has considered a use of a touch panel instead of a projection apparatus. In addition, the present inventor has considered an improvement in operability of an apparatus used for checkout processing by effectively using the touch panel.

One of objects of the present invention is to provide a technique for improving operability of an apparatus used for checkout processing.

Solution to Problem

An image identification register apparatus according to the present invention, including:
an image acquisition unit that acquires an image of a product placed on a touch panel display;
a product identification unit that identifies the product captured in the image;
a display control unit that causes a user interface that receives an input needed for checkout processing of the product to be displayed on the touch panel display according to an identification result of the product; and
a processing execution unit that executes processing based on an input to the user interface.

An image identification register system according to the present invention, including:
a touch panel display used as a placement surface of a product;
an image capturing apparatus that captures the product, and generates an image of the product;
an image acquisition unit that acquires the image of the product placed on the touch panel display;
a product identification unit that identifies the product captured in the image;
a display control unit that causes a user interface that receives an input needed for checkout processing of the product to be displayed on the touch panel display according to an identification result of the product; and
a processing execution unit that executes processing based on an input to the user interface.

An checkout processing method executed by a computer according to the present invention, including:
acquiring an image of a product placed on a touch panel display;
identifying the product captured in the image;
causing a user interface that receives an input needed for checkout processing of the product to be displayed on the touch panel display according to an identification result of the product; and
executing processing based on an input to the user interface.

A program according to the present invention causing a computer to execute the checkout processing method described above.

Advantageous Effects of Invention

According to the present invention, it is possible to improve operability of an apparatus used for checkout processing.

BRIEF DESCRIPTION OF DRAWINGS

The above-described object, the other objects, features, and advantages will become more apparent from suitable example embodiments described below and the following accompanying drawings.

FIG. 20 is a diagram illustrating one example of information that defines processing that needs to be executed according to a track of a pointing object.

EXAMPLE EMBODIMENT

Figure 1:
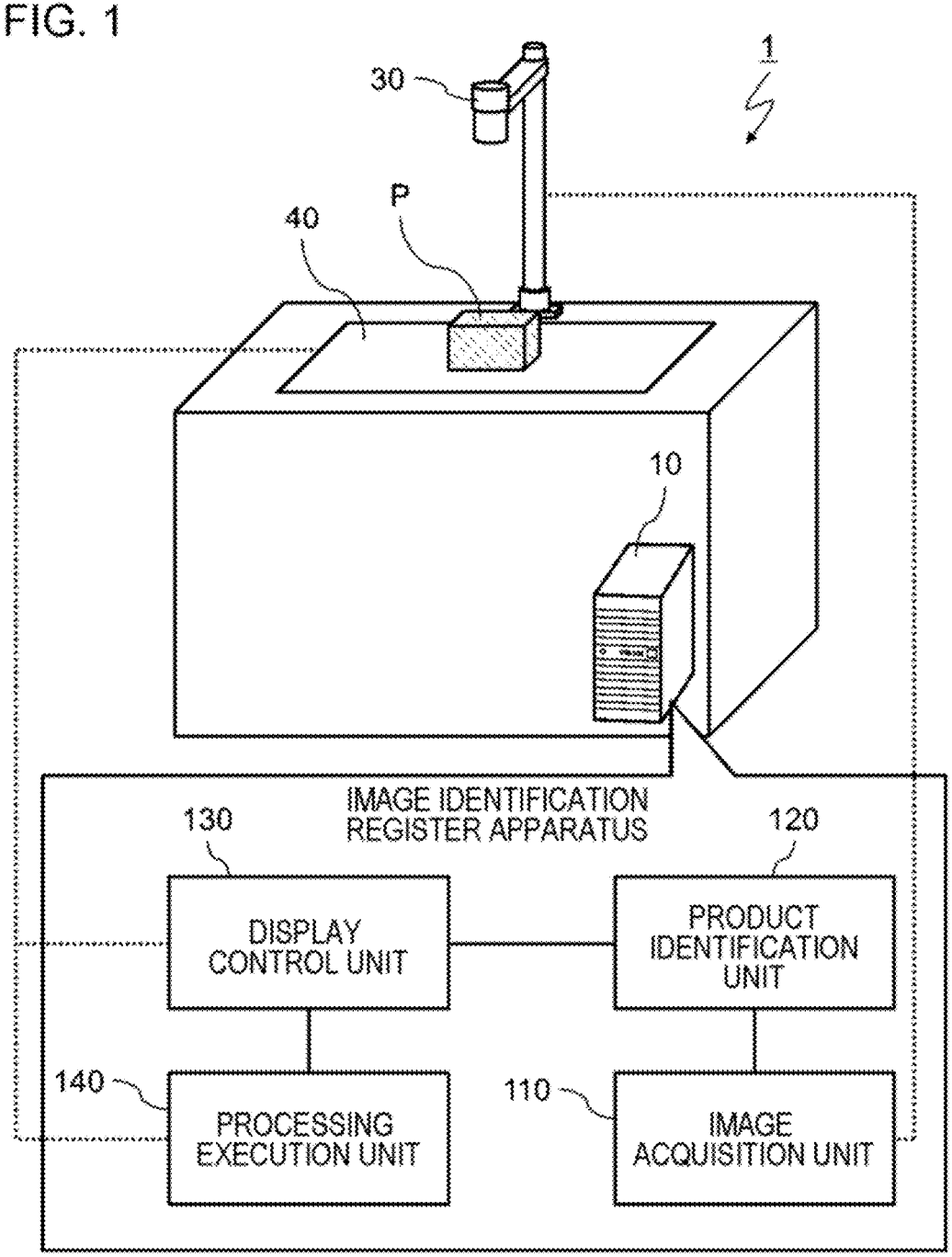
FIG. 1 is a diagram illustrating a configuration example of an image identification register system.

Hereinafter, example embodiments of the present invention will be described by using drawings. Note that, in all of the drawings, the same component has the same reference numeral, and description thereof will not be repeated as appropriate. Further, in each block diagram, each block represents a configuration of a functional unit instead of a configuration of a hardware unit unless otherwise described.

Example Embodiment

System Configuration Example

FIG. 1 is a diagram illustrating a configuration example of an image identification register system 1. Note that FIG. 1 is merely exemplification, and the image identification register system 1 according to the present invention is not limited to a configuration illustrated in FIG. 1. As illustrated in FIG. 1, the image identification register system 1 includes an image identification register apparatus 10, an image capturing apparatus 30, and a touch panel display 40. The image identification register apparatus 10 is connected to the image capturing apparatus 30 and the touch panel display 40 with not-illustrated wiring and the like.

The touch panel display 40 displays various images on a display surface thereof. Further, the touch panel display 40 includes a function of receiving an input by a touch operation using a finger, a touch pen, or the like. Further, as illustrated, the display surface of the touch panel display 40 is also used as a placement surface on which a product P is placed.

As illustrated in FIG. 1, the image capturing apparatus 30 is disposed in such a way as to include the touch panel display 40 in an image capturing range. The image capturing apparatus 30 captures the product P placed on the display surface of the touch panel display 40, and generates an image in which the product P is captured. The image generated by the image capturing apparatus 30 is transmitted to the image identification register apparatus 10.

As illustrated in FIG. 1, the image identification register apparatus 10 according to the present example embodiment includes an image acquisition unit 110, a product identification unit 120, a display control unit 130, and a processing execution unit 140. The image acquisition unit 110 acquires an image generated by the image capturing apparatus 30. The product identification unit 120 identifies a product captured in the image acquired by the image acquisition unit 110. For example, the product identification unit 120 can identify a product captured in an image generated by the image capturing apparatus 30 by using a known object recognition technique (such as pattern matching and a discriminator constructed by machine learning, for example). Further, even when a plurality of products are captured in an image generated by the image capturing apparatus 30, the products can each be identified individually by using a known object recognition algorithm. The display control unit 130 causes a user interface that receives an input needed for checkout processing of the product to be displayed on the touch panel display 40 according to an identification result of the product by the product identification unit 120. Herein, "checkout processing of a product" refers to a series of processing of register work performed when a product is purchased at a store. The processing execution unit 140 executes processing, based on an input to the user interface displayed on the touch panel display 40. A specific example of an operation of the processing execution unit 140 will be described in another example embodiment.

Hardware Configuration Example

The image identification register system 1 may be achieved by hardware (for example, a hard-wired electronic circuit and the like) that achieves each functional component unit, and may be achieved by a combination (for example, a combination of an electronic circuit and a program that controls the electronic circuit and the like) of hardware and software. Hereinafter, a case where the image identification register system 1 is achieved by the combination of hardware and software will be further described.

Figure 2:
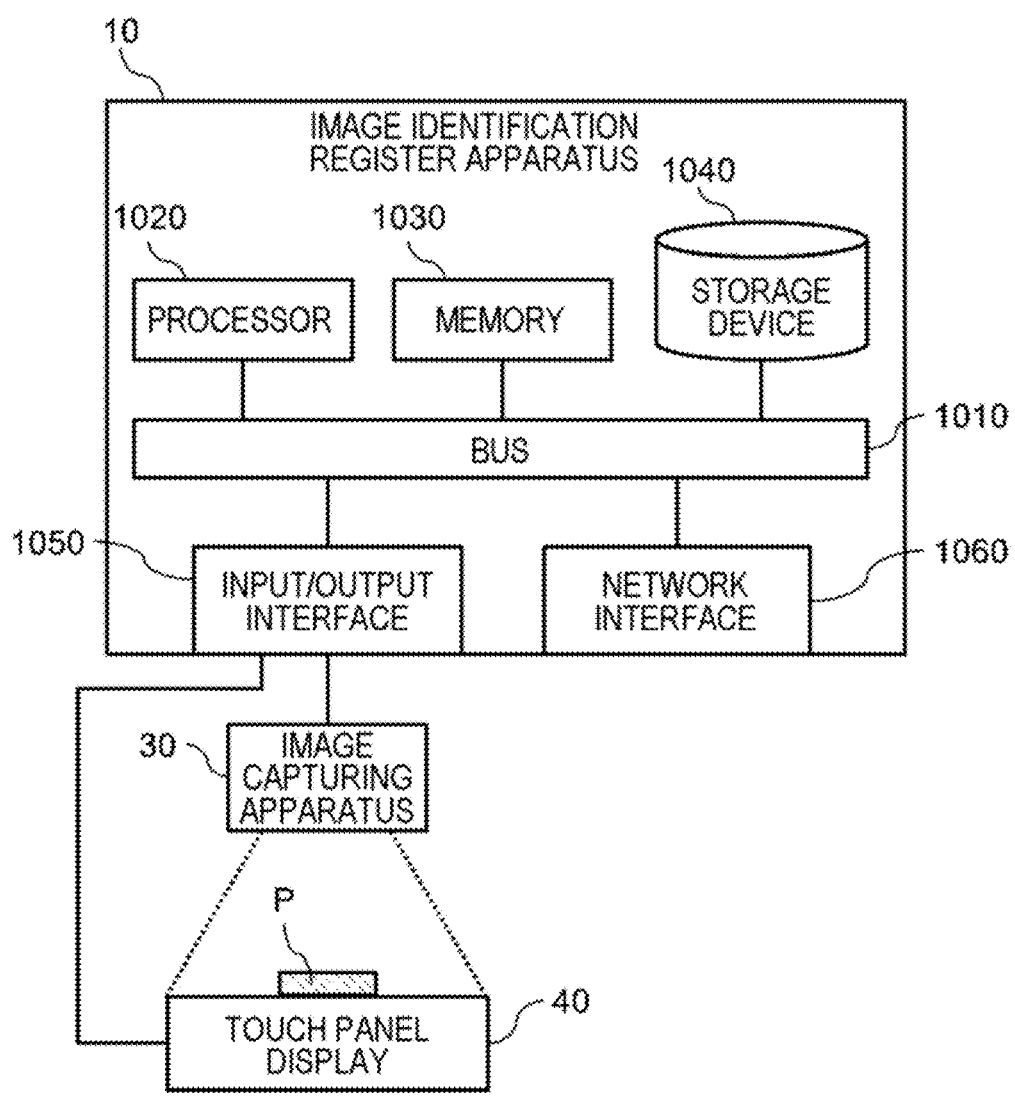
FIG. 2 is a block diagram illustrating a hardware configuration of the image identification register system.

FIG. 2 is a block diagram illustrating a hardware configuration of the image identification register system 1.

The image identification register apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to a bus connection.

The processor 1020 is a processor achieved by a central processing unit (CPU), a graphics processing unit (GPU), and the like.

The memory 1030 is a main storage achieved by a random access memory (RAM) and the like.

The storage device 1040 is an auxiliary storage achieved by a hard disk drive (HDD), a solid state drive (SSD), a memory card, a read only memory (ROM), or the like. The storage device 1040 stores a program module that achieves each function (such as the image acquisition unit 110, the product identification unit 120, the display control unit 130, and the processing execution unit 140) of the image identification register apparatus 10. The processor 1020 reads each program module onto the memory 1030 and executes the read program module, and thus each function associated with the program module is achieved.

The input/output interface 1050 is an interface for connecting the image identification register apparatus 10 and various types of input/output devices. In FIG. 2, the image identification register apparatus 10 is connected to the image capturing apparatus 30 and the touch panel display 40 via the input/output interface 1050. The image capturing apparatus 30 is a camera equipped with, for example, a charge coupled device (CCD) image sensor and a complementary metal oxide semiconductor (CMOS) image sensor. As illustrated, the image capturing apparatus 30 is disposed in such a way as to include the touch panel display 40 (and the product P placed on the touch panel display 40) in the image capturing range. The image capturing apparatus 30 captures the product P placed on the touch panel display 40, and generates an image in which the product P is captured. The touch panel display 40 is a display device including a touch function. Note that the touch panel display 40 is also used as a placement surface of the product P. Thus, a flat-panel display such as a liquid crystal display (LCD), a plasma display panel (PDP), and an organic electro luminescence (EL) is preferably used as the touch panel display 40. Further, a not-illustrated checkout processing apparatus is connected to the input/output interface 1050. Examples of the checkout processing apparatus include an input apparatus, such as a bar code scanner, a cash register, a drawer, an automatic change machine, a receipt printer, a keyboard, and a mouse, and an output apparatus, such as a speaker. Further, as the checkout processing apparatus, a display (display different from the touch panel display 40) for salesclerk or customer may be connected to the image identification register apparatus 10 via the input/output interface 1050.

The network interface 1060 is an interface for connecting the image identification register apparatus 10 to a network. The network is, for example, a local area network (LAN) and a wide area network (WAN). A method of connection to the network by the network interface 1060 may be a wireless connection or a wired connection.

FIG. 2 is merely one example, and the hardware configuration of the image identification register system 1 is not limited to the example in FIG. 2. For example, the image identification register apparatus 10 may be connected to the image capturing apparatus 30 and the touch panel display 40 via the network interface 1060.

Flow of Processing

Figure 3:
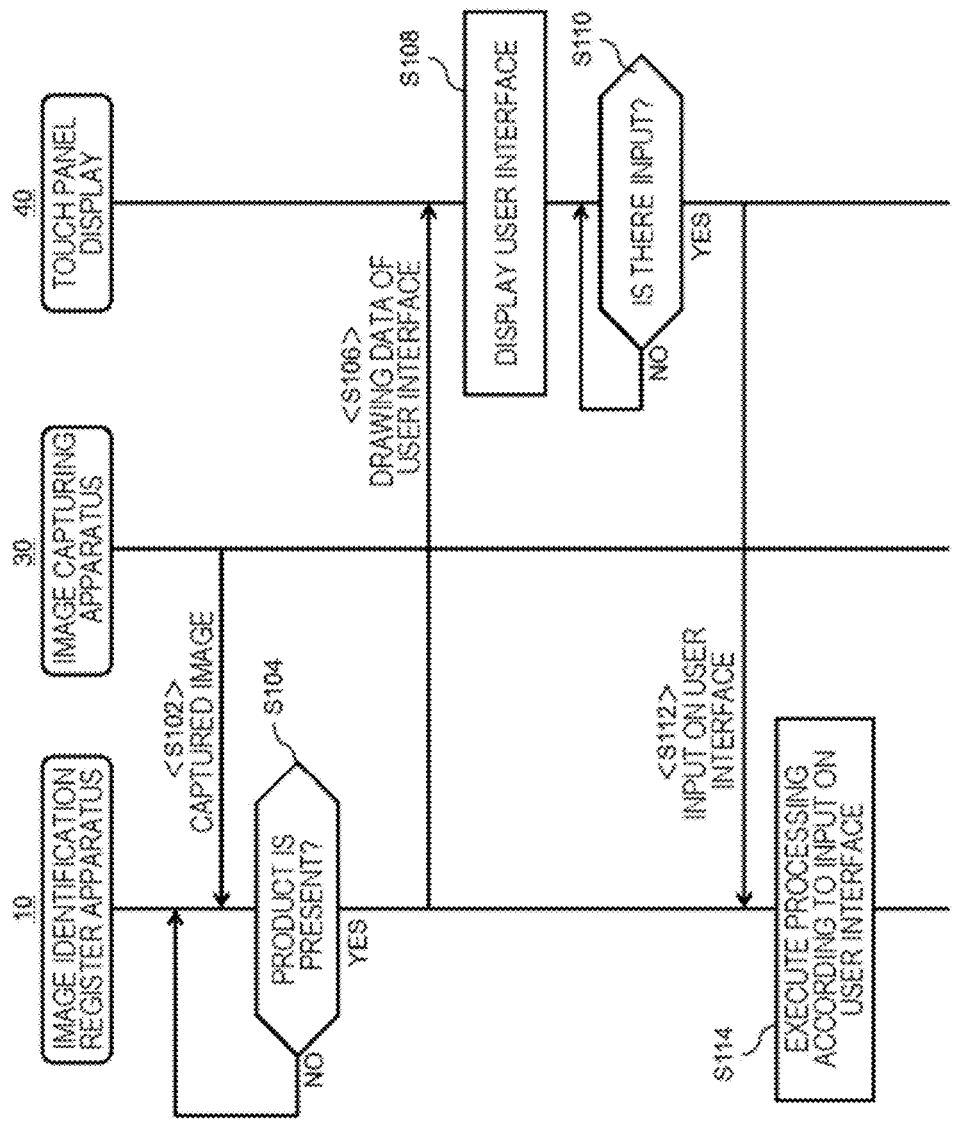
FIG. 3 is a sequence diagram illustrating a flow of processing executed by the image identification register system according to a first example embodiment.

By using FIG. 3, a flow of processing executed by the image identification register system 1 according to the present example embodiment will be described. FIG. 3 is a sequence diagram illustrating the flow of the processing executed by the image identification register system 1 according to a first example embodiment.

First, the image acquisition unit 110 acquires a captured image generated by the image capturing apparatus 30 (S102). For example, the image capturing apparatus 30 always outputs a sensing result (captured image) of an image sensor to the image acquisition unit 110. Further, the image capturing apparatus 30 may be configured to generate an image according to an instruction of the image acquisition unit 110. Then, the product identification unit 120 determines whether a product is present in the captured image acquired by the image acquisition unit 110 (S104). For example, the product identification unit 120 can determine whether a product is present in the captured image (or a feature value extracted from the captured image) acquired by the image acquisition unit 110, based on an output result acquired by inputting the captured image to a product identification engine (not illustrated). In addition, the product identification unit 120 may detect a region of an object from the captured image by using an edge feature value and the like, and then determine whether the object is a product by performing template matching and the like.

When a product is not present in the captured image (S104: NO), the image acquisition unit 110 acquires a new captured image generated by the image capturing apparatus 30, and the product identification unit 120 determines whether a product is present in the new captured image.

On the other hand, when a product is present in the captured image (S104: YES), the product identification unit 120 adds an identification result of the product to a list, and stores the list in the memory 130 and the like, for example. Further, the display control unit 130 generates drawing data of a user interface for receiving an input needed for checkout processing of the product in response to the identification of the product by the product identification unit 120, and transmits the drawing data to the touch panel display 40 (S106). The touch panel display 40 displays, on the touch panel display 40, the user interface by using the drawing data acquired from the display control unit 130 (S108). Then, when an input is performed on the user interface displayed on the touch panel display 40 (S110), information about the input performed on the user interface is transmitted to the image identification register apparatus 10 (S112). The processing execution unit 140 determines processing according to the input to the user interface being acquired by the processing in S112, and executes the determined processing (S114).

As described above, in the present example embodiment, when a product placed on the touch panel display 40 is identified by using an image in which the product is captured, a user interface is displayed on the touch panel display 40 according to an identification result of the product. The user interface receives an input needed for checkout processing of the product. Then, the processing is executed based on the input performed on the user interface.

In this way, an input operation needed for the checkout processing of the product can be completed on the touch panel display 40. In other words, the number of times an apparatus that needs to be operated in the checkout processing of the product is switched from the touch panel display 40 to another apparatus is reduced. Thus, an effect of improving operability of a user of the image identification register system 1 can be expected. Furthermore, the image identification register system 1 can easily acquire an action (such as a cancel operation of a product, for example) from a customer in checkout processing by effectively using the touch panel display 40 as in the present example embodiment.

Specific Example

Hereinafter, a specific operation example of the above-described image identification register system 1 will be described.

First Specific Example

In the present specific example, the display control unit 130 causes, to be displayed on the touch panel display 40, a user interface (hereinafter expressed as a "first user interface") for proceeding to payment processing of products.

Figure 4:
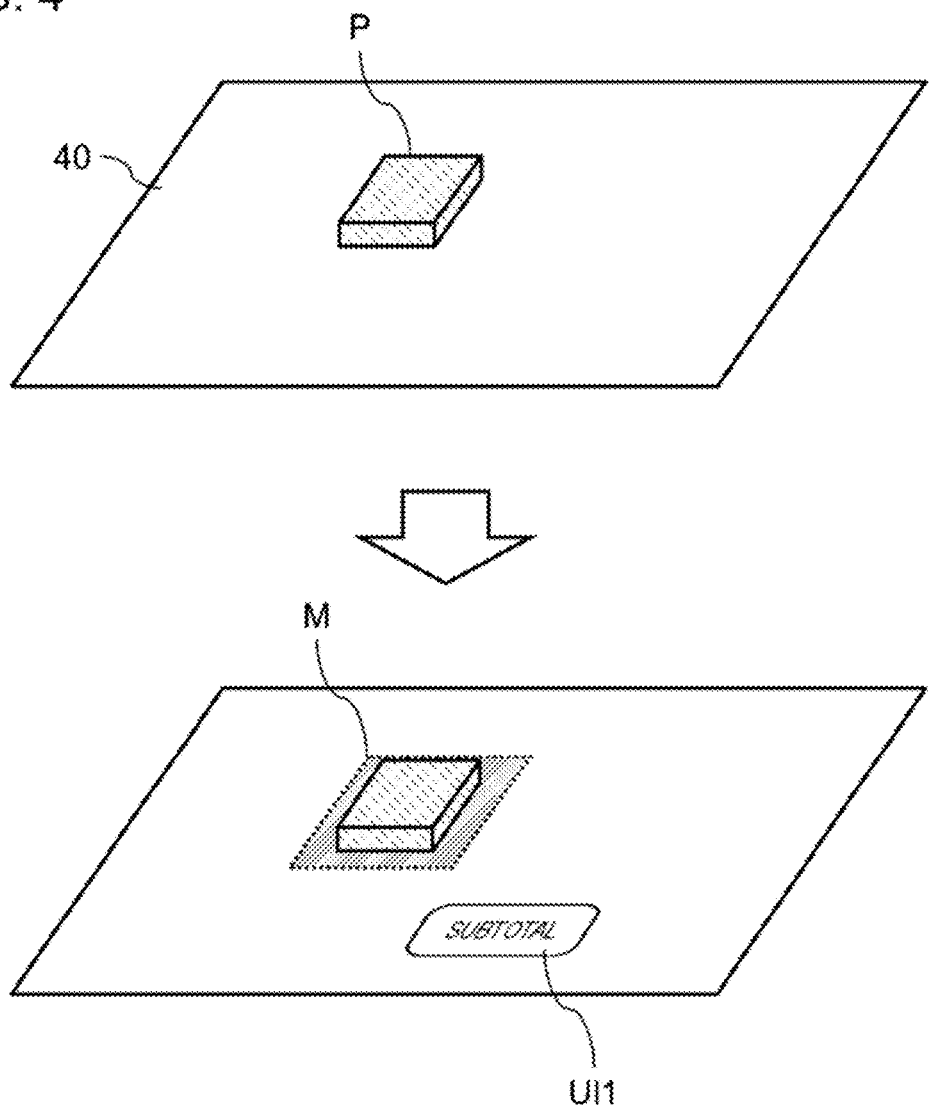
FIG. 4 is a diagram illustrating one example of a first user interface displayed by a display control unit.

FIG. 4 is a diagram illustrating one example of the first user interface displayed by the display control unit 130. An upper half in FIG. 4 illustrates a situation where the product P is placed on the display surface of the touch panel display 40. Further, a lower half in FIG. 4 illustrates a situation where a subtotal button UI1 (first user interface) is displayed on the touch panel display 40 in response to the identification of the product P placed on the display surface of the touch panel display 40. In this case, processing indicated as follows is executed.

First, the product identification unit 120 identifies the product P by analyzing an image in which the product P is captured. Then, the display control unit 130 displays a mark M indicating that the product is identified on the touch panel display 40 as illustrated in a lower half portion in FIG. 4. Note that the display control unit 130 previously holds a transformation rule for transforming "coordinates in an image generated by the image capturing apparatus 30" to "coordinates on the display surface (placement surface of the product P) of the touch panel display 40". Then, the display control unit 130 can transform a position (coordinates) of the product P in the image to a position (coordinates) on the display surface of the touch panel display 40, based on the transformation rule, and display the frame-shaped mark M in such a way as to surround the transformed position, for example. Further, the display control unit 130 causes the subtotal button UI1 (first user interface) as illustrated to be displayed on the touch panel display 40 in response to the identification of the product P. The display control unit 130 can determine a display position of the subtotal button UI1 (first user interface), based on the position of the product P. In the example in FIG. 4, the display control unit 130 causes the subtotal button UI1 (first user interface) to be displayed near the product P. In this case, for example, the display control unit 130 can determine, as a display position of the subtotal button UI1 (first user interface), a region in which another product and another display are not present within a predetermined distance from the position of the product P Note that the display control unit 130 can determine a region in which another product and another display are not present within the predetermined distance from the position of the product P by analyzing an image acquired by the image acquisition unit 110 and the like.

Figure 5:
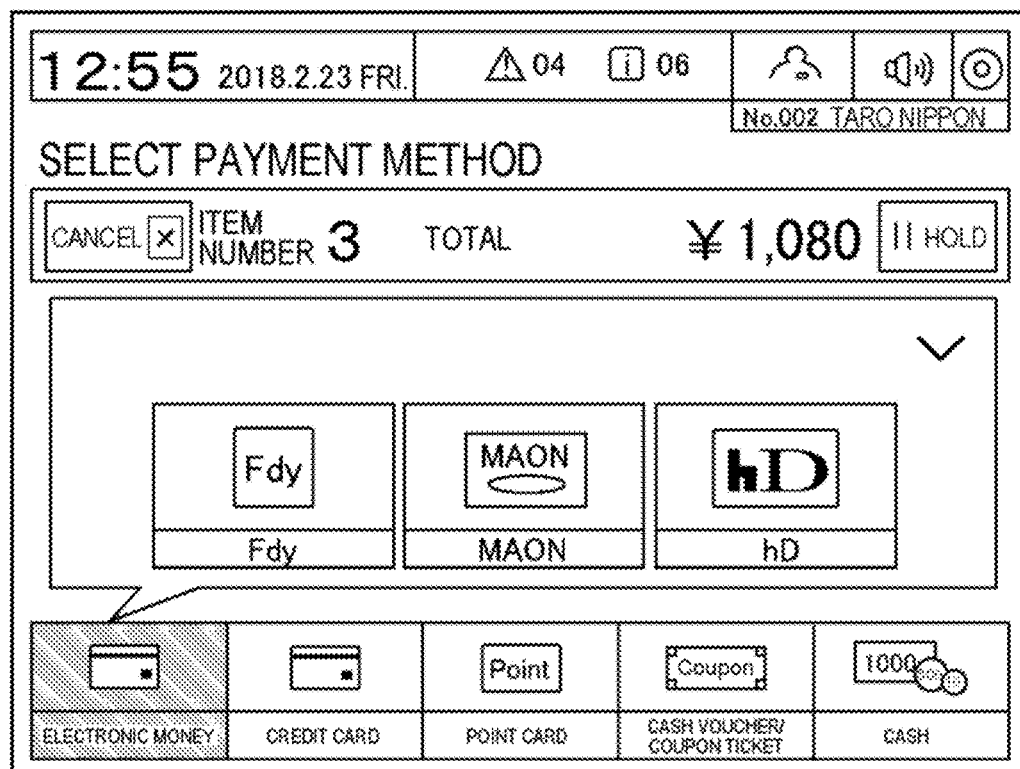
FIG. 5 is a diagram illustrating one example of a payment processing screen displayed by the display control unit.

The processing execution unit 140 executes payment processing of products in response to an input (for example, a pressing operation) on the subtotal button UI1 (first user interface). For example, the processing execution unit 140 transmits an instruction to the display control unit 130, and causes a payment processing screen S1 as illustrated in FIG. 5 to be displayed on the touch panel display 40. FIG. 5 is a diagram illustrating one example of the payment processing screen. FIG. 5 illustrates the screen S1 in which various payment methods (electronic money, credit card, point provided by royalty program, coupon ticket/cash voucher, cash) are selectable. A customer can select a desired payment method in the screen S1, and make a payment of products.

Figure 6:
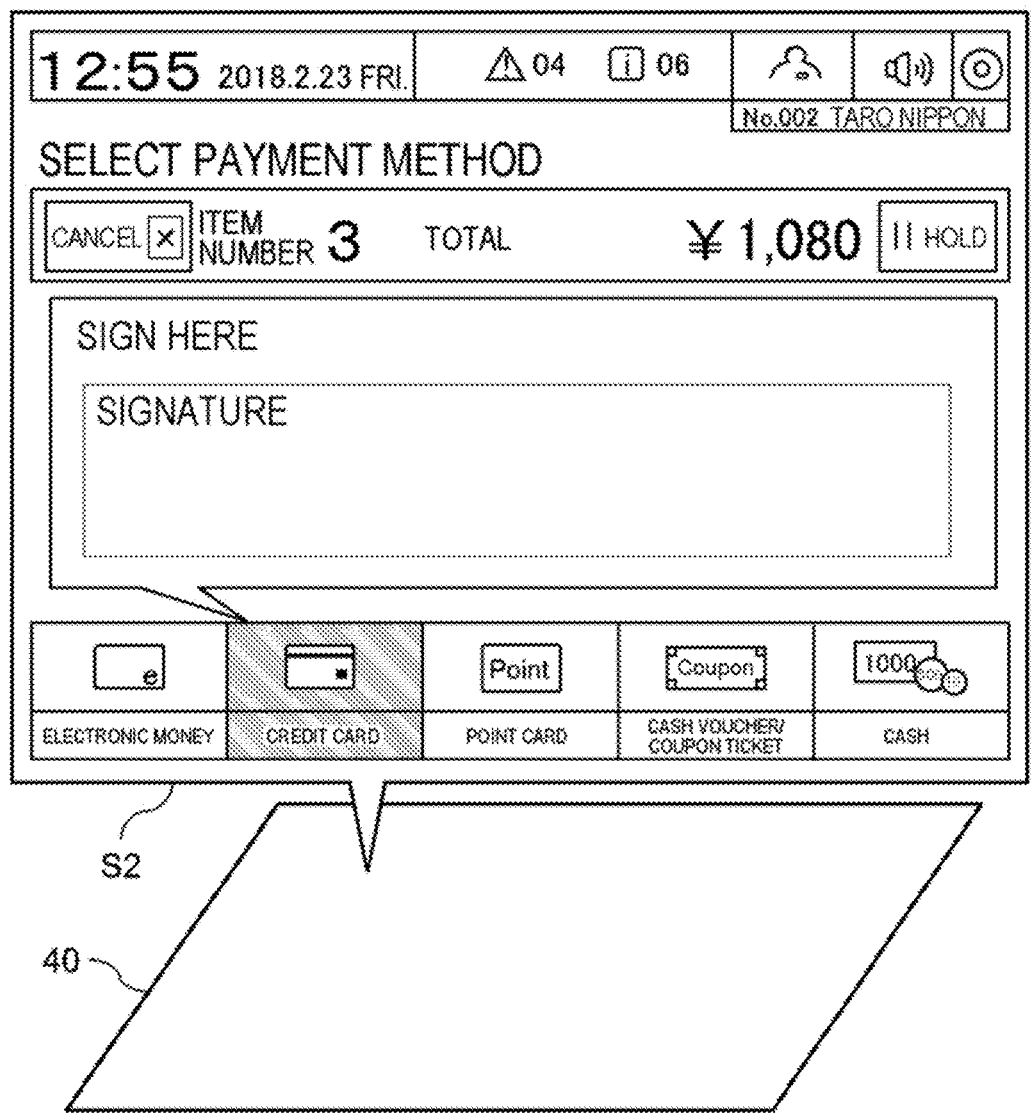
FIG. 6 is a diagram illustrating one example of the payment processing screen displayed by the display control unit.
Figure 7:
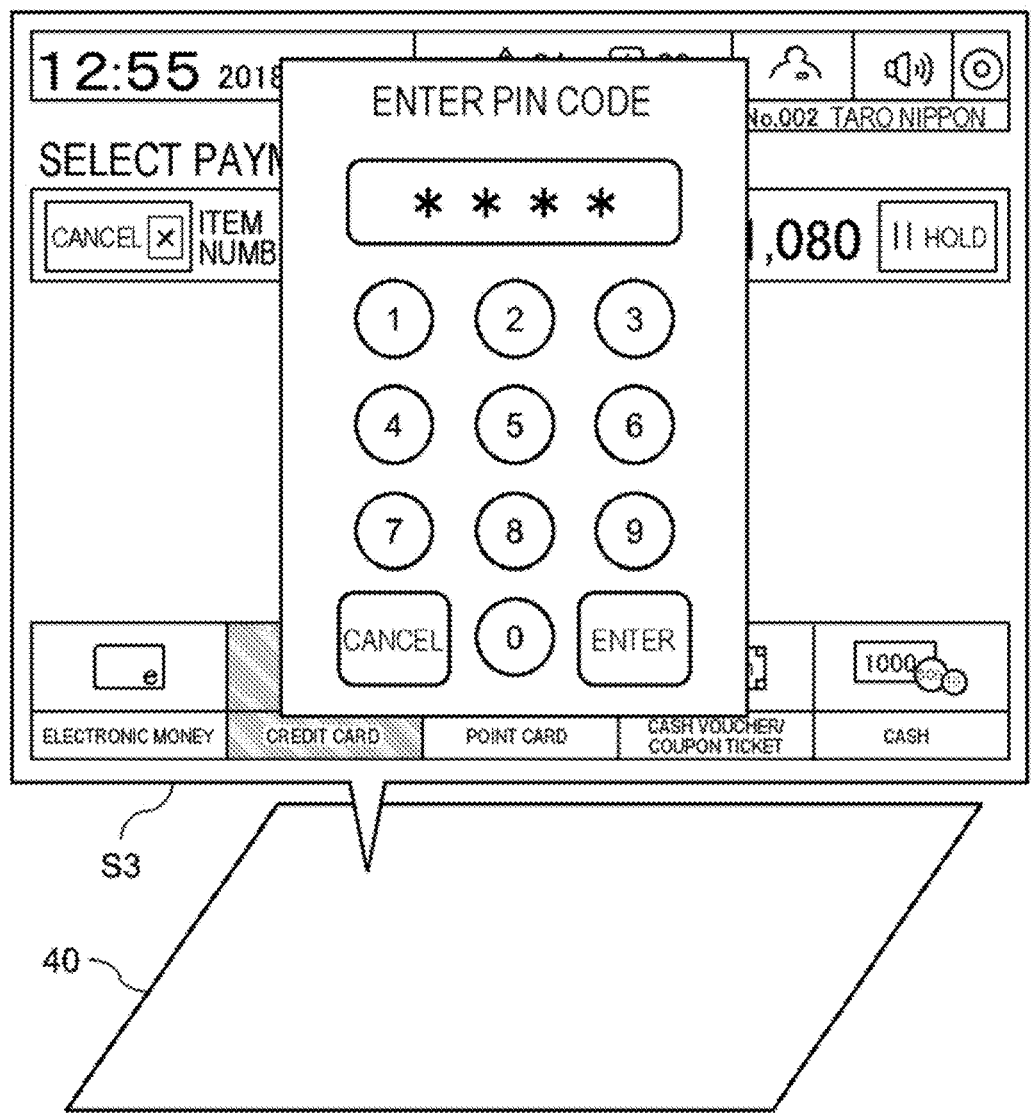
FIG. 7 is a diagram illustrating one example of the payment processing screen displayed by the display control unit.

Further, when a payment method that requires personal authentication, such as a payment by a credit card, is selected in the screen S1, the processing execution unit 140 may further cause a screen (for example, FIGS. 6 and 7) that receives an input of information for personal authentication to be displayed. FIGS. 6 and 7 are diagrams each illustrating one example of a payment processing screen displayed by the display control unit 130. FIG. 6 illustrates a screen S2 including an input form that receives an input of a signature for personal authentication. FIG. 7 illustrates a screen S3 including an input form that receives an input of a personal identification number (PIN) for personal authentication. When the screen in FIG. 6 or 7 is displayed, processing as follows is executed.

First, after "credit card" is selected in the screen S1 in FIG. 5, a credit card is read by a not-illustrated card reader and the like. Then, the processing execution unit 140 transmits an instruction to the display control unit 130, and causes the payment processing screen S2 as illustrated in FIG. 6 or the payment processing screen S3 as illustrated in FIG. 7 to be displayed on the touch panel. When the payment processing screen S2 is displayed, a customer signs his or her name in the input form on the screen. In this way, the processing execution unit 140 can acquire a track of the signature on the touch panel display 40. Further, when the payment processing screen S3 is displayed, a customer enters his or her PIN code in the input form on the screen. In this way, the processing execution unit 140 can acquire the PIN code of the customer. Then, the processing execution unit 140 can complete processing of a credit card settlement by using the signature or the PIN code of the customer. Note that the PIN code is information having a high degree of concealment. Thus, the processing execution unit 140 may cause the input form as illustrated in FIG. 7 to be displayed on a not-illustrated touch panel display for customer use or the like instead of the touch panel display 40.

Second Specific Example

In a staff cafeteria and the like, a purchaser of a product may be identified by an identification card such as a staff identity card. In the present specific example, the image identification register system 1 includes a configuration as illustrated in FIG. 8.

Figure 8:
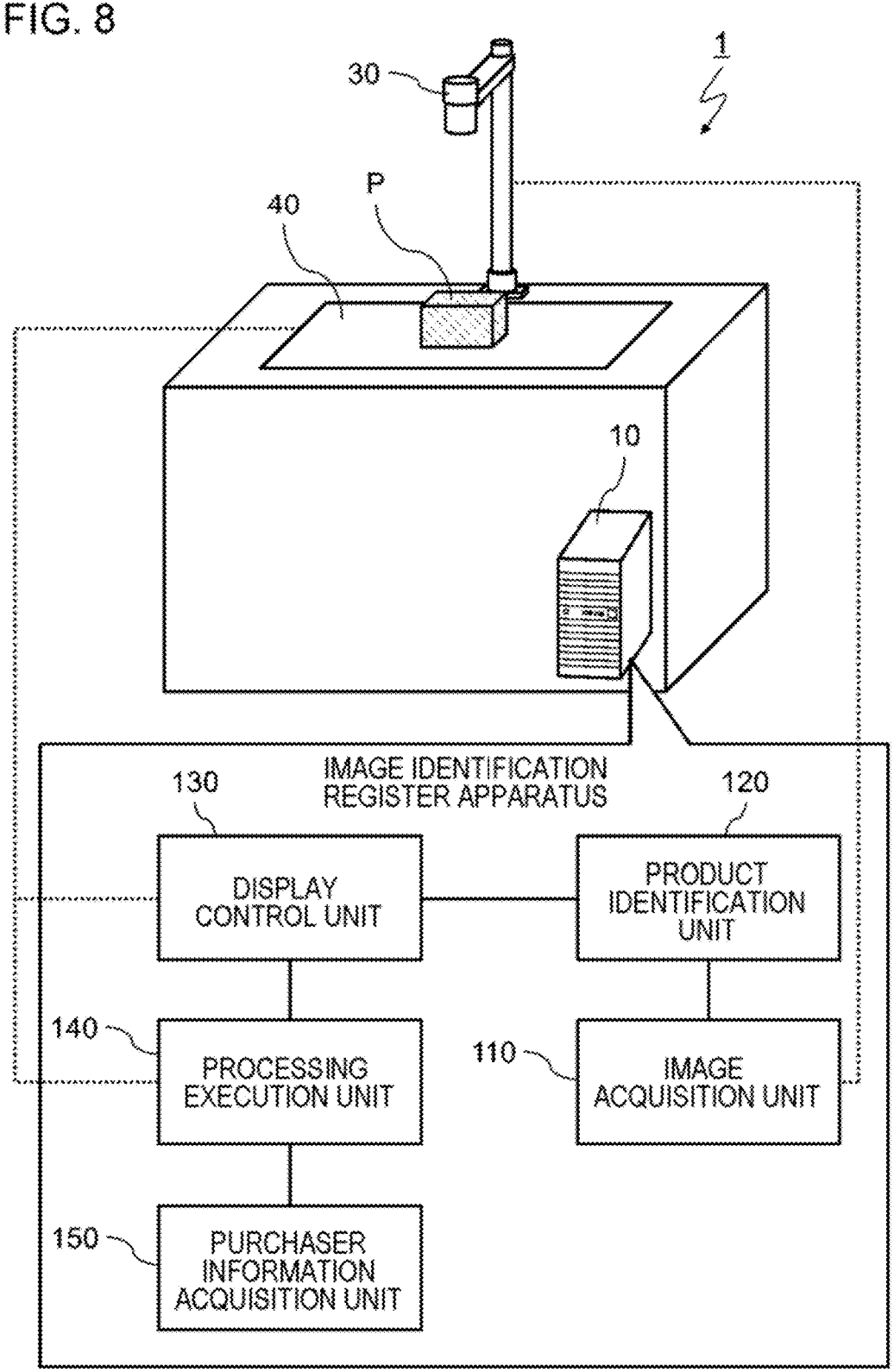
FIG. 8 is a diagram illustrating a configuration example of an image identification register system in a second specific example.

FIG. 8 is a configuration example of the image identification register system 1 in a second specific example. As illustrated in FIG. 8, in the present specific example, the image identification register apparatus 10 further includes a purchaser information acquisition unit 150. The purchaser information acquisition unit 150 acquires purchaser identification information. The purchaser identification information is information that can identify a purchaser of a product. In the case of the staff cafeteria described above, for example, a staff number stored in an IC tag of a staff identity card, a face image of a staff described on the staff identity card, and the like may be used as the purchaser identification information. In this case, the purchaser information acquisition unit 150 can acquire the purchaser identification information such as a staff number from a staff identity card by using a not-illustrated card reader and the like. Further, the purchaser information acquisition unit 150 can acquire, by using the image capturing apparatus 30 or another not-illustrated image capturing apparatus, an image in which a staff number or a face image are captured by capturing a surface of a staff identity card on which the staff number and the face image are printed. The processing execution unit 140 can acquire the purchaser identification information by analyzing the image acquired by the purchaser information acquisition unit 150. For example, when a staff number is included in an image, the processing execution unit 140 can read the staff number (purchaser identification information) from the image by using an optical character recognition (OCR) technique. Further, the processing execution unit 140 can acquire information that identifies a person (purchaser) by performing face authentication using a face image of a staff identity card. Then, when an input is performed on the first user interface as illustrated in FIG. 5 and the purchaser identification information is acquired, the processing execution unit 140 executes the payment processing of products.

Note that a function of preventing spoofing by using another staff identity card and the like may be added in the present specific example. For example, when the purchaser identification information is acquired, the processing execution unit 140 may transmit an instruction to the display control unit 130, and further cause a user interface (hereinafter expressed as a "second interface") that receives an input of information for personal authentication to be displayed on the touch panel display 40.

Figure 9:
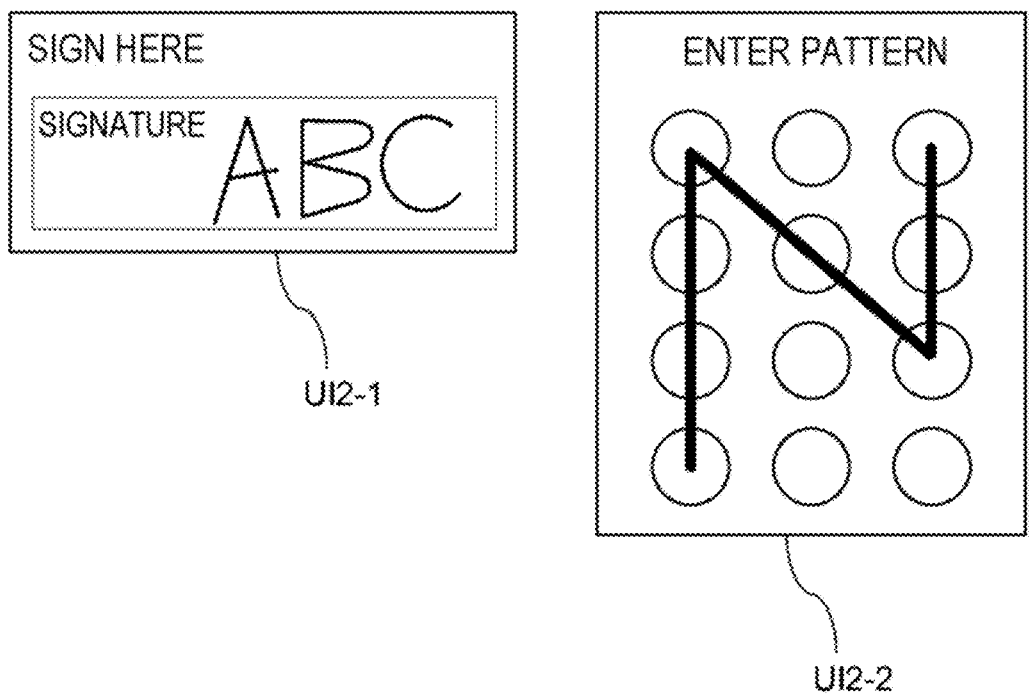
FIG. 9 is a diagram illustrating one example of a second user interface displayed by the display control unit.

FIG. 9 is a diagram illustrating one example of a second user interface displayed by the display control unit 130. FIG. 9 illustrates, as a specific example of the second user interface, an input form UI2-1 that receives an input of a signature for personal authentication and an input form UI2-2 that causes a customer to enter a predetermined track pattern. The processing execution unit 140 can perform personal authentication by comparing a signature and a track pattern that are input to the input forms with previously registered information.

Third Specific Example

Figure 10:
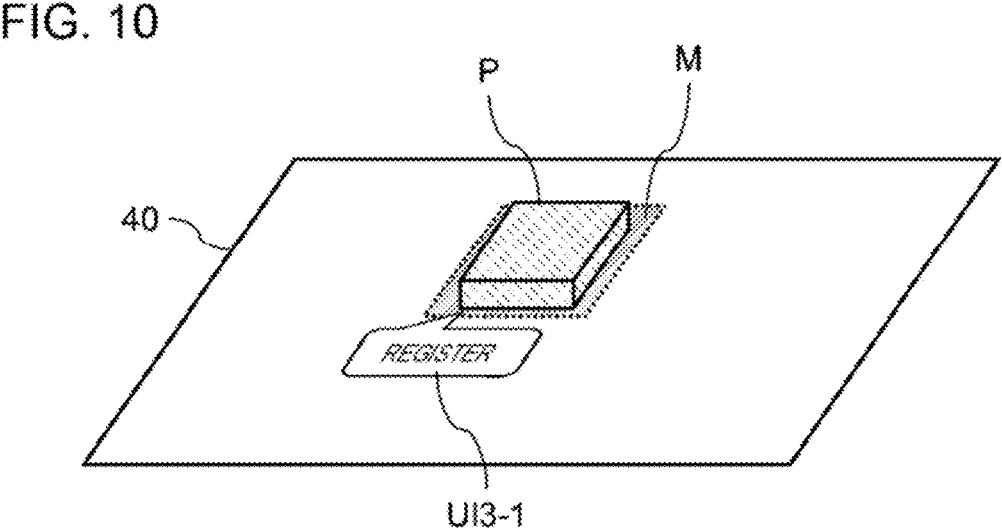
FIG. 10 is a diagram illustrating one example of a third user interface displayed by the display control unit.
Figure 11:
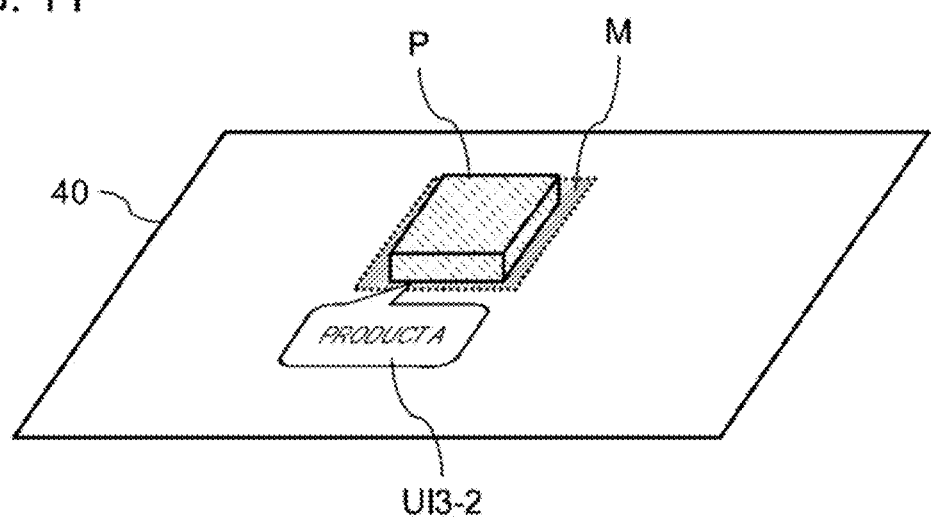
FIG. 11 is a diagram illustrating one example of the third user interface displayed by the display control unit.
Figure 12:
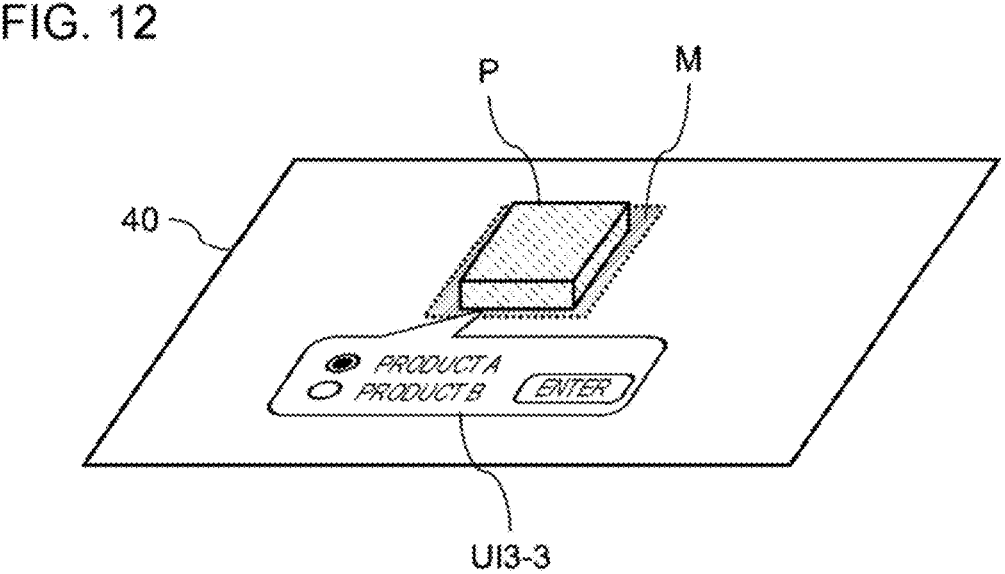
FIG. 12 is a diagram illustrating one example of the third user interface displayed by the display control unit.

In the present specific example, the display control unit 130 causes, to be displayed on the touch panel display 40, a user interface (hereinafter expressed as a "third user interface") for determining a product price for a product to be purchased. For example, the display control unit 130 can cause the third user interface as illustrated in FIGS. 10 to 12 to be displayed on the touch panel display 40. FIGS. 10 to 12 are diagrams each illustrating one example of the third user interface displayed by the display control unit 130.

FIG. 10 illustrates a situation where a registration button UI3-1 (third interface) is displayed near the product P.

Further, FIG. 11 illustrates a situation where a user interface UI3-2 (third interface) that includes an identification result (herein, a product name) of the product by the product identification unit 120 and is selectable is displayed near the product P.

In a case of FIGS. 10 and 11, for example, processing as follows is executed. First, the product identification unit 120 identifies the product P placed on the touch panel display 40 by using an image acquired by the image acquisition unit 110. At this time, the product identification unit 120 transmits position information about the product P in the image to the display control unit 130. Then, the display control unit 130 transforms a position (coordinates) of the product P in the image to a position (coordinates) on the display surface of the touch panel display 40, based on the above-described transformation rule. Then, the display control unit 130 determines a display position of the registration button UI3-1 and the user interface UI3-2 (third interface), based on the position of the product P. For example, the display control unit 130 can determine, as a display position of the registration button UI3-1 and the user interface UI3-2 (third interface), a region in which another product and another display are not present within a predetermined distance from the position of the product P. Note that the display control unit 130 can determine a region in which another product and another display are not present within the predetermined distance from the position of the product P by analyzing an image acquired by the image acquisition unit 110 and the like.

Further, the processing execution unit 140 determines, in response to an input (for example, a pressing operation) on the registration button UI3-1 and the user interface UI3-2 (third user interface), a product identified by the product identification unit 120 as a product to be purchased. Specifically, the processing execution unit 140 adds information about the product identified by the product identification unit 120 to a list of products to be purchased being stored in the memory 1030 and the like, for example. Further, when the product P on the touch panel display 40 is registered as a product to be purchased, the processing execution unit 140 may transmit an instruction to the display control unit 130, and cause, to be displayed, a special mark M indicating that the product P is registered as a product to be purchased. For example, the display control unit 130 may cause the frame-shaped mark M to flash at a stage at which a product is identified by the product identification unit 120, and may stop flashing of the frame-shaped mark M at a stage at which the product is registered as a product to be purchased and always cause the frame-shaped mark M to be displayed. Further, the display control unit 130 may be configured to change a color, darkness of display, and the like of the mark M depending on whether a stage is the stage at which a product is identified by the product identification unit 120 or the stage at which the product is registered as a product to be purchased.

Note that, since the product identification unit 120 identifies a product by using an image, an identification result thereof may not be uniquely determined. For example, a plurality of products may also be identified as candidates for a product placed on the touch panel display 40. In such a case, as illustrated in FIG. 12, the display control unit 130 may cause, to be displayed on the touch panel display 40, a user interface UI3-3 for selecting any of the plurality of products identified as the candidates. In this case, the processing execution unit 140 determines the product selected on the user interface UI3-3 as a product to be purchased. Specifically, the processing execution unit 140 adds information about the product selected on the user interface UI3-3 from the plurality of products identified by the product identification unit 120 to a list of products to be purchased being stored in the memory 1030 and the like, for example.

In the examples in FIGS. 11 and 12 described above, the display control unit 130 may cause, to be displayed on the touch panel display 40, a user interface including an image of a product identified by the product identification unit 120 in addition to (or instead of) a product name. Note that an "image of a product identified by the product identification unit 120" displayed herein is not an image acquired by the image acquisition unit 110. The "image of a product identified by the product identification unit 120" is previously registered in a predetermined storage apparatus (for example, the storage device 1040), for example. The display control unit 130 can read, by using an identification result of a product by the product identification unit 120, an image associated with the identified product from among images of products being previously stored in the storage device 1040 and the like.

Fourth Specific Example

In the present specific example, the display control unit 130 causes, to be displayed on the touch panel display 40, a user interface (hereinafter expressed as a "fourth user interface") for correcting an identification result of the product identification unit 120.

Figure 13:
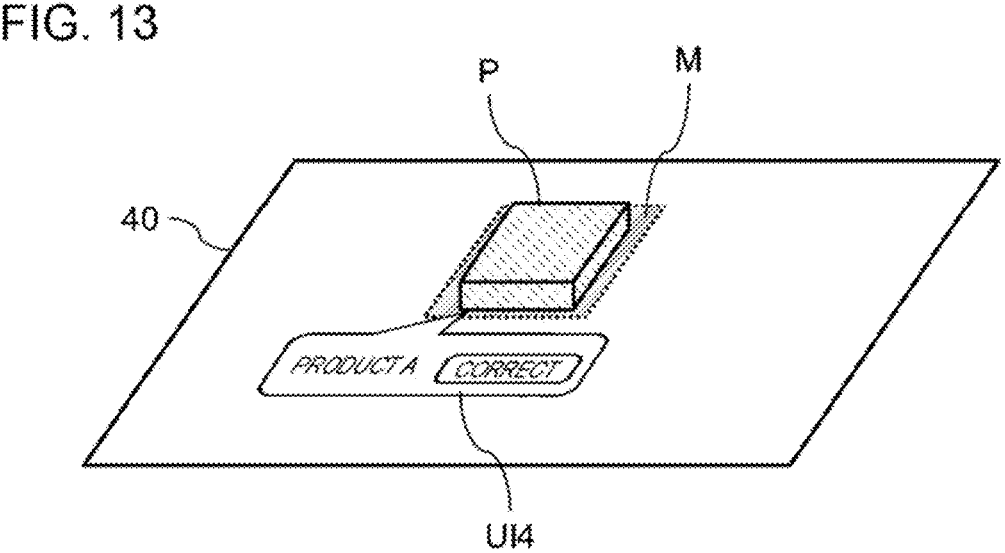
FIG. 13 is a diagram illustrating one example of a fourth user interface displayed by the display control unit.

FIG. 13 is a diagram illustrating one example of the fourth user interface displayed by the display control unit 130. FIG. 13 illustrates, together with an identification result of a product by the product identification unit 120, a user interface UI4 including a correction button for correcting the identification result.

In a case of FIG. 13, for example, processing as follows is executed. First, the product identification unit 120 identifies the product P placed on the touch panel display 40 by using an image acquired by the image acquisition unit 110. At this time, the product identification unit 120 transmits position information about the product P in the image to the display control unit 130. Then, the display control unit 130 transforms a position (coordinates) of the product P in the image to a position (coordinates) on the display surface of the touch panel display 40, based on the above-described transformation rule. Then, the display control unit 130 determines a display position of the user interface UI4 (fourth interface), based on the position of the product P. For example, the display control unit 130 can determine, as a display position of the user interface UI4 (fourth interface), a region in which another product and another display are not present within a predetermined distance from the position of the product P. Note that the display control unit 130 can determine a region in which another product and another display are not present within the predetermined distance from the position of the product P by analyzing an image acquired by the image acquisition unit 110 and the like.

The processing execution unit 140 executes processing of correcting an identification result of the product identification unit 120 in response to an input (for example, a pressing operation on a correction button) on the user interface UI4 (fourth user interface). In one example, the processing execution unit 140 transmits an instruction to the display control unit 130, and causes a not-illustrated input form for inputting a correct product name to be displayed on the touch panel display 40. The processing execution unit 140 acquires information about the product based on the product name input to the input form displayed in such a manner, and transmits the information as information for correction to the display control unit 130. The display control unit 130 updates (corrects) display on the touch panel display 40 by using the information about the product acquired by the processing execution unit 140. Further, in another example, the processing execution unit 140 may cause the product identification unit 120 to execute again the identification processing of the product P on the touch panel display 40. In this case, the processing execution unit 140 notifies the product identification unit 120 that an identification result of the product in a present situation is incorrect. The product identification unit 120 previously excludes, according to the notification from the processing execution unit 140, the product being currently identified, and then executes again the identification processing of the product. In this way, the incorrect identification result can be prevented from being displayed again.

Fifth Specific Example

Figure 14:
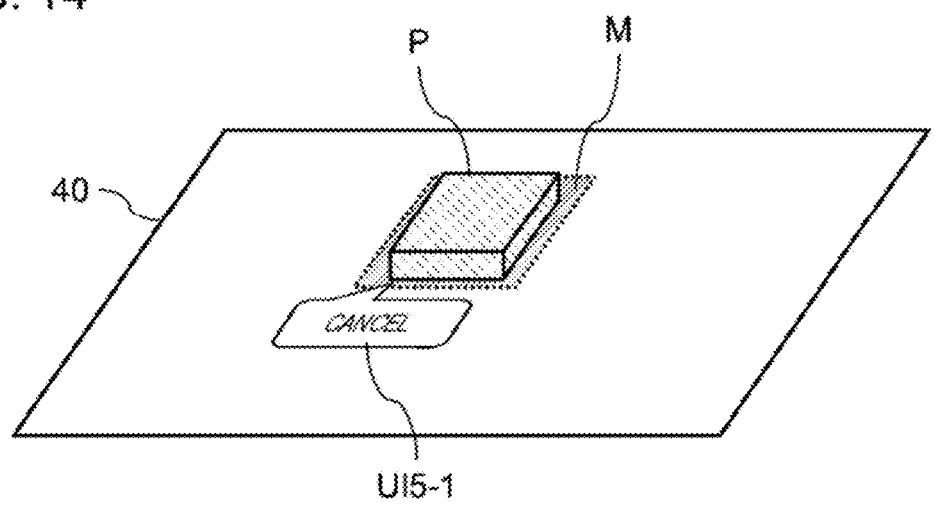
FIG. 14 is a diagram illustrating one example of a fifth user interface displayed by the display control unit.
Figure 15:
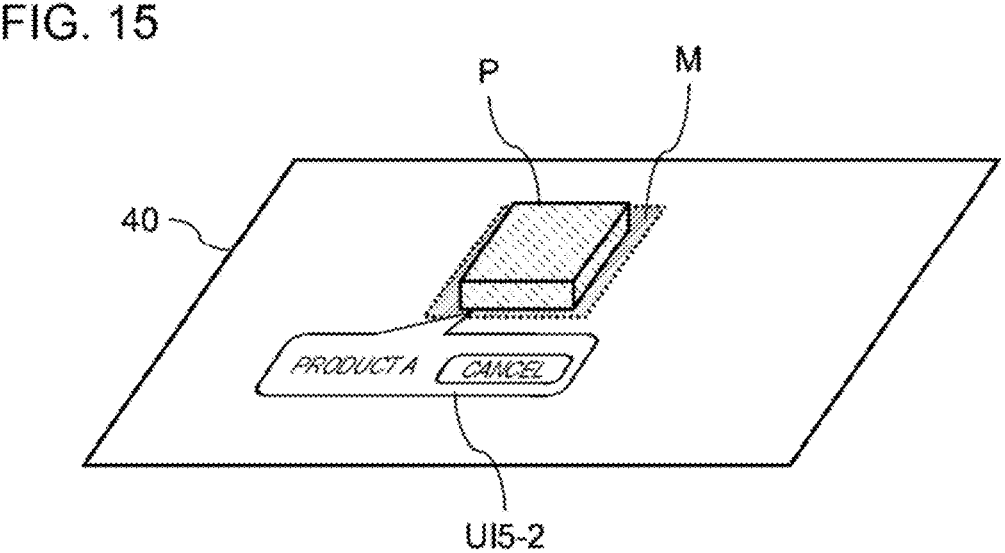
FIG. 15 is a diagram illustrating one example of the fifth user interface displayed by the display control unit.
Figure 16:
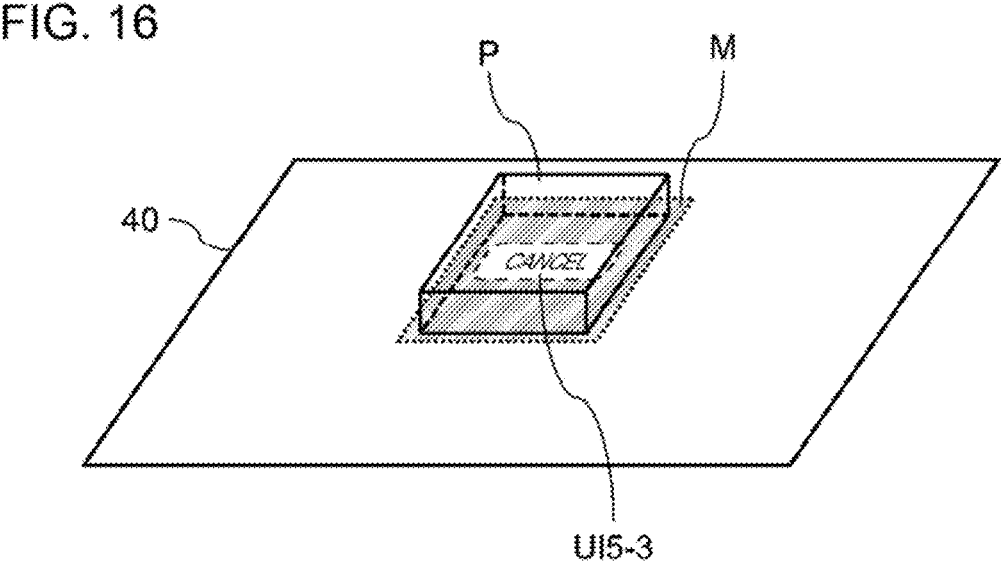
FIG. 16 is a diagram illustrating one example of the fifth user interface displayed by the display control unit.

In the present specific example, the display control unit 130 causes, to be displayed on the touch panel display 40, a user interface (hereinafter expressed as a "fifth user interface") for canceling a purchase of a product. For example, the display control unit 130 causes the fifth user interface as illustrated in FIGS. 14 to 16 to be displayed on the touch panel display 40. FIGS. 14 to 16 are diagrams each illustrating one example of the fifth user interface displayed by the display control unit 130.

FIG. 14 illustrates a situation where a cancel button UI5-1 (fifth interface) is displayed near the product P.

Further, FIG. 15 illustrates a situation where a user interface UI5-2 (fifth interface) including a cancel button together with an identification result (herein, a product name) of the product by the product identification unit 120 is displayed.

In a case of FIGS. 14 and 15, for example, processing as follows is executed. First, the product identification unit 120 identifies the product P placed on the touch panel display 40 by using an image acquired by the image acquisition unit 110. At this time, the product identification unit 120 transmits position information about the product P in the image to the display control unit 130. Then, the display control unit 130 transforms a position (coordinates) of the product P in the image to a position (coordinates) on the display surface of the touch panel display 40, based on the above-described transformation rule. Then, the display control unit 130 determines a display position of the cancel button UI5-1 and the user interface UI5-2 (fifth interface), based on the position of the product P. For example, the display control unit 130 can determine, as a display position of the cancel button UI5-1 and the user interface UI5-2 (fifth interface), a region in which another product and another display are not present within a predetermined distance from the position of the product P. Note that the display control unit 130 can determine a region in which another product and another display are not present within the predetermined distance from the position of the product P by analyzing an image acquired by the image acquisition unit 110 and the like.

Further, FIG. 16 illustrates a situation where the cancel button UI5-3 is displayed in a region on the touch panel display 40 in which the product P is placed.

In a case of FIG. 16, for example, processing as follows is executed. First, the product identification unit 120 identifies the product P placed on the touch panel display 40 by using an image acquired by the image acquisition unit 110. At this time, the product identification unit 120 transmits position information about the product P in the image to the display control unit 130. Then, the display control unit 130 transforms a position (coordinates) of the product P in the image to a position (coordinates) on the display surface of the touch panel display 40, based on the above-described transformation rule. Then, for example, the display control unit 130 causes the cancel button UI5-3 to be displayed at the center of the position of the product P (region of the product P). In the example in FIG. 16, when the product P is placed on the touch panel display 40, the cancel button UI5-3 cannot be visually recognized. In this case, the cancel button UI5-3 can be viewed by removing the product P from the touch panel display 40 by a customer for canceling a purchase of the product P.

Further, the processing execution unit 140 cancels, in response to an input (for example, a pressing operation) to the fifth user interface illustrated in FIGS. 14 to 16, a purchase of a corresponding product. Specifically, the processing execution unit 140 deletes information about the product on which the input of the fifth user interface is performed from a list of identification results (identified products) of the product identification unit 120 being stored in the memory 1030 and the like, for example. Then, the display control unit 130 cancels display of the mark M exemplified in each of the drawings in response to the deletion of the information about the product.

Figure 17:
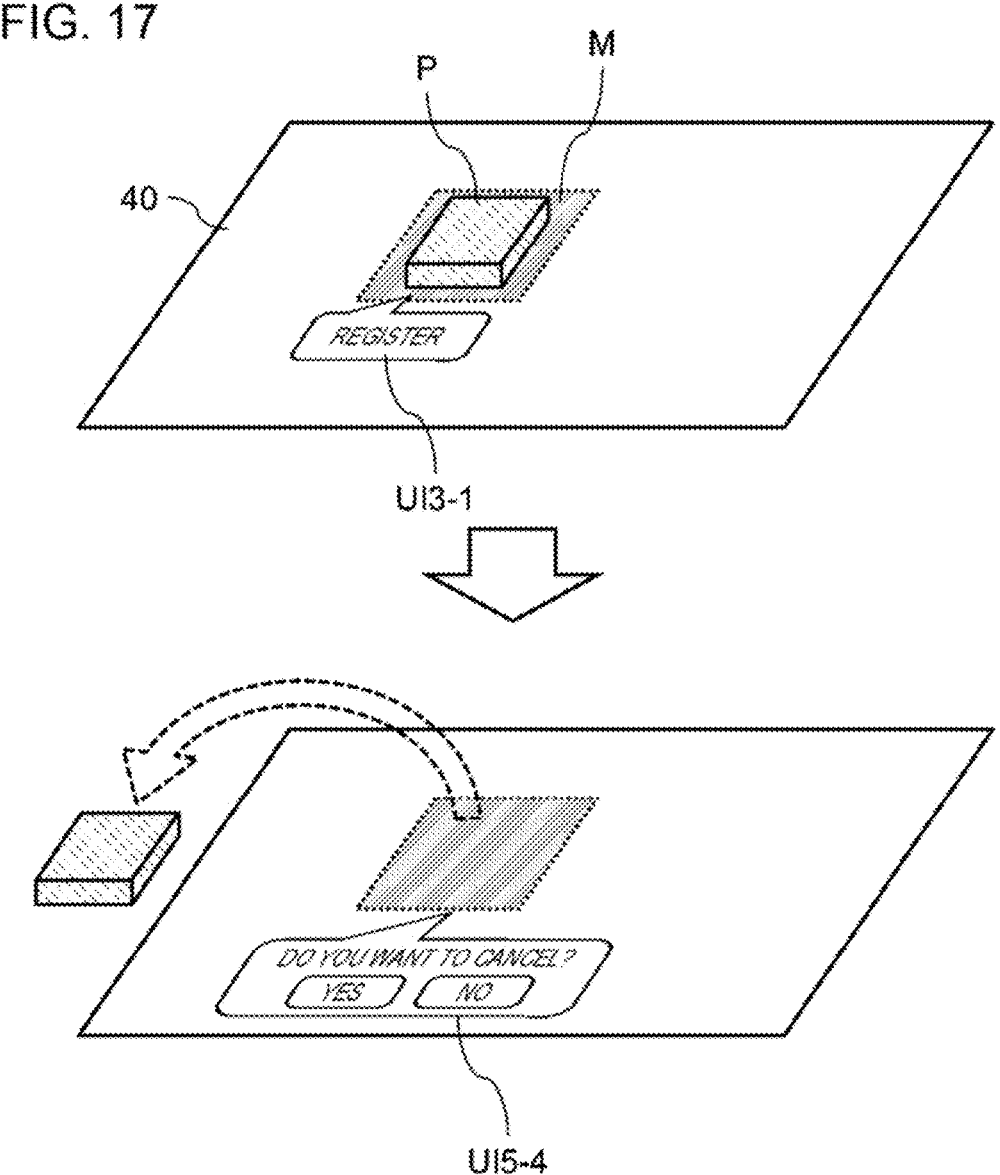
FIG. 17 is a diagram illustrating one example of the fifth user interface displayed by the display control unit.

Further, as illustrated in FIG. 17, the display control unit 130 may be configured to display the fifth user interface when the product P is removed (moved) from the touch panel display 40.

FIG. 17 is a diagram illustrating one example of the fifth user interface displayed by the display control unit 130. Similarly to FIG. 10, an upper half in FIG. 17 illustrates a situation where the registration button UI3-1 (first user interface) is displayed near the product P. A lower half in FIG. 17 illustrates how the display of the touch panel display 40 changes when the product P is removed from the touch panel display 40. Specifically, when the product P is removed from the touch panel display 40, the display control unit 130 displays a fifth user interface UI5-4 as illustrated in the drawing near a region in which the removed product P has been located. When "yes" is pressed herein, the processing execution unit 140 executes the processing of canceling a purchase of the product as described above. Further, when "no" is pressed herein, the processing execution unit 140 outputs a message prompting a return of the product to the position of the mark M by using the touch panel display 40, a not-illustrated speaker, or the like.

Seventh Specific Example

Figure 18:
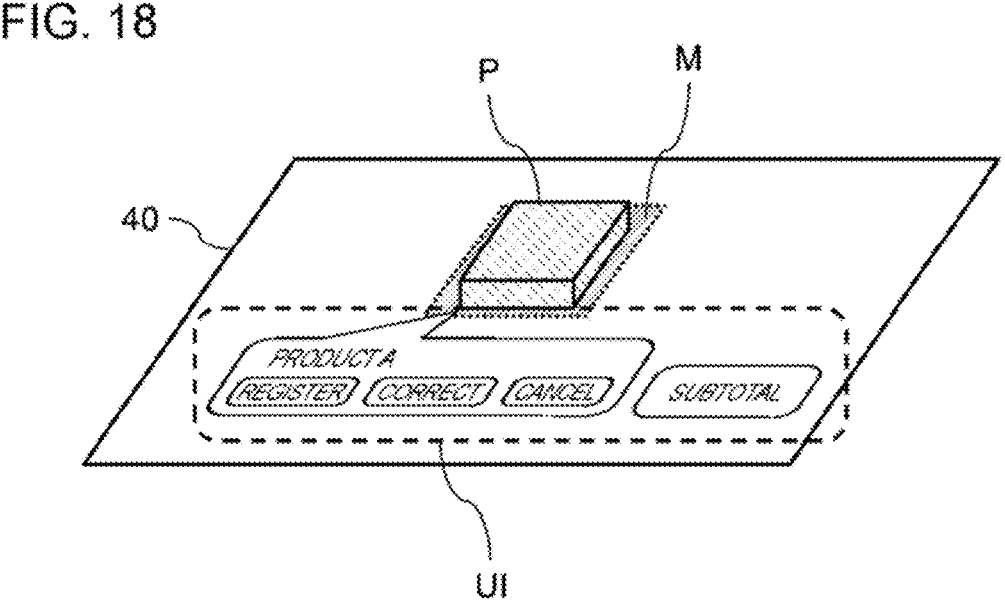
FIG. 18 is a diagram illustrating one example of a comprehensive user interface displayed by the display control unit.

The display control unit 130 may display, on the touch panel display 40, a comprehensive user interface in which the user interfaces illustrated in the first to sixth specific examples are combined (for example, FIG. 18). FIG. 18 is a diagram illustrating one example of a comprehensive user interface displayed by the display control unit 130. In the example in FIG. 18, a comprehensive user interface UI including a subtotal button (first user interface), a registration button (third user interface), a correction button (fourth user interface), and a cancel button (fifth user interface) is illustrated. Note that an operation when each of the buttons is pressed is as described in each of the specific examples.

Eighth Specific Example

In the present specific example, the display control unit 130 causes, to be displayed on the touch panel display 40, a user interface (hereinafter expressed as a "sixth user interface") for acquiring a track of a pointing object on the touch panel display 40. Herein, the pointing object is an object for performing a touch operation on the touch panel display 40, and is specifically a finger of a person, a touch pen, and the like.

Figure 19:
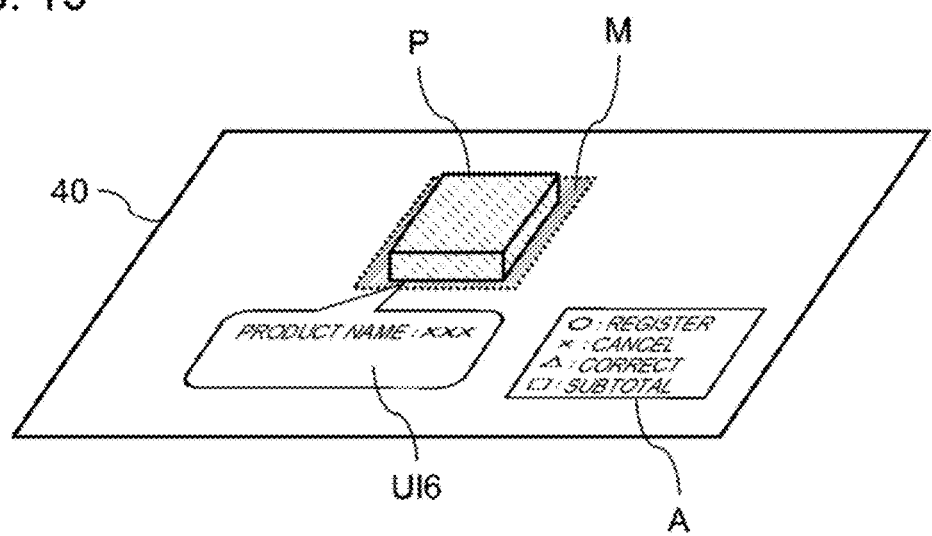
FIG. 19 is a diagram illustrating one example of a sixth user interface displayed by the display control unit.

FIG. 19 is a diagram illustrating one example of the sixth user interface displayed by the display control unit 130. In the example in FIG. 19, a situation where an input region UI6 having a balloon shape is displayed as the sixth user interface is illustrated. A customer and a salesclerk draw a predetermined track by moving the pointing object in the input region UI6. When the processing execution unit 140 acquires the drawn track, the processing execution unit 140 executes processing according to the acquired track. For example, the processing execution unit 140 can determine processing that needs to be executed according to the acquired track by referring to information as illustrated in FIG. 20. FIG. 20 is a diagram illustrating one example of information that defines processing that needs to be executed according to a track of a pointing object. FIG. 20 illustrates a table that stores, in association with each other, the track of the pointing object and the information that needs to be executed. Note that FIG. 20 is merely one example, and information that defines processing that needs to be executed according to a track of a pointing object is not limited to FIG. 20. For example, processing that needs to be executed may be defined according to a track associated with an operation (for example, a double tapping operation, a swiping operation, and the like) possible on the touch panel display 40. The processing execution unit 140 first determines a shape of a track drawn in the input region UI6. For example, it is assumed that a track of a circle (or a shape close to a circle) is drawn in the input region. In this case, the processing execution unit 140 registers, as a purchase target, a product (herein, a product having a product name of "XXX") identified by the product identification unit 120. Further, for example, it is assumed that a track of an X sign (or a shape close to an X sign) is drawn in the input region.

In this case, the processing execution unit 140 executes the processing of canceling a purchase of a product (herein, a product having a product name of "XXX") identified by the product identification unit 120. Further, for example, it is assumed that a track of a triangle (or a shape close to a triangle) is drawn in the input region. In this case, the processing execution unit 140 executes the processing of correcting an identification result (herein, an identification result that "product name: XXX") of the product identification unit 120. Further, for example, it is assumed that a track of a square (or a shape close to a square) is drawn in the input region. In this case, the processing execution unit 140 executes the payment processing of products.

Further, as illustrated in FIG. 19, the display control unit 130 may display information A indicating processing to be executed by track on the touch panel display 40. By displaying the information A, a customer and a salesclerk can easily recognize what track needs to be drawn in order to execute desired processing.

While the example embodiments of the present invention have been described with reference to the drawings, these example embodiments are exemplification of the present invention and various configurations other than those described above can also be employed.

For example, the present invention is applicable to not only a general method in which an operation from registration of a purchase product to payment of a price is performed on a salesclerk apparatus but also a so-called semi-self method and a self method. In the semi-self method, a register apparatus for product registration and a checkout apparatus for a payment are separately provided. The register apparatus for product registration can have the function of the image identification register apparatus 10 described above. Further, in the self method, from registration of a purchase product to payment of a price are performed with an apparatus operated by a customer. The apparatus operated by a customer can have the function of the image identification register apparatus 10 described above.

Further, in the image identification register system 1 according to the present invention, a display without having a touch function, a projector that projects an image onto a projection surface, and the like may be used instead of the touch panel display 40. In this case, the processing execution unit 140 operates as follows, for example. The processing execution unit 140 first detects a position of a pointing object (for example, a hand and a finger of a user and the like) in an image displayed on a display surface of the display or an image projected from the projector. Note that the processing execution unit 140 can detect and track the position of the pointing object by using a known object recognition algorithm. Then, the processing execution unit 140 can determine presence or absence of an input to a user interface displayed on the display (or a user interface projected onto a projection surface), based on the detected position of the pointing object. Then, when there is an input to the user interface displayed on the display (or the user interface projected on the projection surface), the processing execution unit 140 executes processing associated with the input as described in each of the example embodiments described above.

Further, the plurality of steps (processing) are described in order in the sequence diagram used in the above-described description, but an execution order of the steps is not limited to the described order. The execution order of the illustrated steps may be changed within an extent that there is no harm in context.

A part or the whole of the above-mentioned example embodiment may also be described in supplementary notes below, which is not limited thereto.

1.

An image identification register apparatus, including:

an image acquisition unit that acquires an image of a product placed on a touch panel display;

a product identification unit that identifies the product captured in the image;

a display control unit that causes a user interface that receives an input needed for checkout processing of the product to be displayed on the touch panel display according to an identification result of the product; and a processing execution unit that executes processing based on an input to the user interface.

2.

The image identification register apparatus according to supplementary note 1, wherein the display control unit causes a first user interface for proceeding to payment processing of products to be displayed on the touch panel display

3.

The image identification register apparatus according to supplementary note 2, further including a purchaser information acquisition unit that acquires purchaser identification information that identifies a purchaser of the product, wherein the processing execution unit executes payment processing of products when an input to the first user interface and acquisition of the purchaser identification information are completed.

4.

The image identification register apparatus according to supplementary note 3, wherein the display control unit causes a second user interface that receives an input of information for personal authentication about the purchaser to be displayed on the touch panel display in response to acquisition of the purchaser identification information.

5.

The image identification register apparatus according to any one of supplementary notes 1 to 4, wherein the display control unit causes, to be displayed on the touch panel display, a third user interface for determining the product as a product to be purchased.

6.

The image identification register apparatus according to supplementary note 5, wherein the display control unit causes a user interface including an identification result of a product by the product identification unit to be displayed as the third user interface on the touch panel display.

7.

The image identification register apparatus according to supplementary note 6, wherein the display control unit causes, when a plurality of products are identified as candidates by the product identification unit, a user interface for selecting any of the plurality of products to be displayed as the third user interface on the touch panel display.

8.

The image identification register apparatus according to any one of supplementary notes 1 to 7, wherein the display control unit causes a fourth user interface for correcting an identification result of the product identification unit to be displayed on the touch panel display.

9.

The image identification register apparatus according to any one of supplementary notes 1 to 8, wherein the display control unit causes a fifth user interface for canceling a purchase of the product to be displayed on the touch panel display.

10.

The image identification register apparatus according to supplementary note 1, wherein the display control unit causes a sixth user interface for acquiring a track of a pointing object on the touch panel display to be displayed on the touch panel display, and the processing execution unit executes processing associated with the track of the pointing object being acquired by the sixth user interface.

11.

The image identification register apparatus according to any one of supplementary notes 1 to 10, wherein the display control unit determines a display position of the user interface, based on a position of the product placed on the touch panel display.

12.

An image identification register system, including:

a touch panel display used as a placement surface of a product;

an image capturing apparatus that captures the product, and generates an image of the product;

an image acquisition unit that acquires the image of the product placed on the touch panel display;

a product identification unit that identifies the product captured in the image;

a display control unit that causes a user interface that receives an input needed for checkout processing of the product to be displayed on the touch panel display according to an identification result of the product; and a processing execution unit that executes processing based on an input to the user interface.

13.

The image identification register system according to supplementary note 12, wherein the display control unit causes a first user interface for proceeding to payment processing of products to be displayed on the touch panel display.

14.

The image identification register system according to supplementary note 13, further including a purchaser information acquisition unit that acquires purchaser identification information that identifies a purchaser of the product, wherein the processing execution unit executes payment processing of products when an input to the first user interface and acquisition of the purchaser identification information are completed.

15.

The image identification register system according to supplementary note 14, wherein the display control unit causes a second user interface that receives an input of information for personal authentication about the purchaser to be displayed on the touch panel display in response to acquisition of the purchaser identification information.

16.

The image identification register system according to any one of supplementary notes 12 to 15, wherein the display control unit causes, to be displayed on the touch panel display, a third user interface for determining the product as a product to be purchased.

17.

The image identification register system according to supplementary note 16,
wherein the display control unit causes a user interface including an identification result of a product by the product identification unit to be displayed as the third user interface on the touch panel display.

18. The image identification register system according to supplementary note 17,
wherein the display control unit causes, when a plurality of products are identified as candidates by the product identification unit, a user interface for selecting any of the plurality of products to be displayed as the third user interface on the touch panel display.

19. The image identification register system according to any one of supplementary notes 12 to 18,
wherein the display control unit causes a fourth user interface for correcting an identification result of the product identification unit to be displayed on the touch panel display.

20. The image identification register system according to any one of supplementary notes 12 to 19,
wherein the display control unit causes a fifth user interface for canceling a purchase of the product to be displayed on the touch panel display.

21. The image identification register system according to supplementary note 12,
wherein the display control unit causes a sixth user interface for acquiring a track of a pointing object on the touch panel display to be displayed on the touch panel display, and
the processing execution unit executes processing associated with the track of the pointing object being acquired by the sixth user interface.

22. The image identification register system according to any one of supplementary notes 12 to 21,
wherein the display control unit determines a display position of the user interface, based on a position of the product placed on the touch panel display.

23. An checkout processing method executed by a computer including: acquiring an image of a product placed on a touch panel display;
identifying the product captured in the image;
causing a user interface that receives an input needed for checkout processing of the product to be displayed on the touch panel display according to an identification result of the product; and
executing processing, based on an input to the user interface.

24. The checkout processing method executed by the computer according to supplementary note 23, further including causing a first user interface for proceeding to payment processing of a product price to be displayed on the touch panel display.

25. The checkout processing method executed by the computer according to supplementary note 24, further including:
acquiring purchaser identification information that identifies a purchaser of the product; and
executing payment processing of products when an input to the first user interface and acquisition of the purchaser identification information are completed.

26. The checkout processing method executed by the computer according to supplementary note 25, further including causing a second user interface that receives an input of information for personal authentication about the purchaser to be displayed on the touch panel display in response to acquisition of the purchaser identification information.

27. The checkout processing method executed by the computer according to any one of supplementary notes 23 to 26, further including causing, to be displayed on the touch panel display, a third user interface for determining the product as a product to be purchased.

28. The checkout processing method executed by the computer according to supplementary note 27, further including causing a user interface including an identification result of the product to be displayed as the third user interface on the touch panel display.

29. The checkout processing method executed by the computer according to supplementary note 28, further including causing, when a plurality of products are identified as candidates, a user interface for selecting any of the plurality of products to be displayed as the third user interface on the touch panel display.

30. The checkout processing method executed by the computer according to any one of supplementary notes 23 to 29, further including causing a fourth user interface for correcting an identification result of the product to be displayed on the touch panel display.

31. The checkout processing method executed by the computer according to any one of supplementary notes 23 to 30, further including causing a fifth user interface for canceling a purchase of the product to be displayed on the touch panel display.

32. The checkout processing method executed by the computer according to supplementary note 23, further including:
causing a sixth user interface for acquiring a track of a pointing object on the touch panel display to be displayed on the touch panel display; and
executing processing associated with the track of the pointing object being acquired by the sixth user interface.

33. The checkout processing method executed by the computer according to any one of supplementary notes 23 to 32, further including determining a display position of the user interface, based on a position of the product placed on the touch panel display.

34. A program causing a computer to execute the checkout processing method according to any one of supplementary notes 23 to 33.

The invention claimed is:
1. An image identification register apparatus, comprising:
a memory storing instructions; and
one or more processors configured to execute instructions to:
acquire an image of a product placed on a touch panel display;
identify, by machine learning comprising pattern matching and a discriminator, the product placed on the touch panel display and captured in the image;

display, on the touch panel display, a user interface that receives user inputs on the touch panel display and needed for checkout processing of the product, according to an identification result of the product, the user interface including a registering interface configured to receive an operation comprising at least one of the user inputs as an input registering the product as a product to be purchased; and execute processing based on an input to the user interface, wherein the one or more processors are further configured to execute the instructions to:

output, on the touch panel display, a mark indicating an identified product based on a position of the identified product; and change appearance of the mark when the identified product is registered as a product to be purchased by the operation of the registering interface displayed on the touch panel display on which the product is placed, wherein the user interface further comprises a plurality of registering interfaces, including the registering interface, each respective to ones of a plurality of products, including the product, placed on the touch panel display, wherein each of the registering interfaces comprises, for each of the products, a register interface button, a correct interface button, and a cancel interface button, wherein operating the register interface button confirms whether to proceed with a purchase of at least one of the products, wherein operating the correct interface button operates to correct identification of at least one of the products, and wherein operating the cancel interface button operates to cancel a purchase operation of at least one of the products.

2. The image identification register apparatus according to claim 1, wherein the one or more processors are further configured to execute the instructions to display, on the touch panel display, a first user interface for proceeding to payment processing of products.

3. The image identification register apparatus according to claim 2, wherein the one or more processors are further configured to execute the instructions to:

acquire purchaser identification information that identifies a purchaser of the product; and execute payment processing of products when an input to the first user interface and acquisition of the purchaser identification information are completed.

4. The image identification register apparatus according to claim 3, wherein the one or more processors are further configured to execute the instructions to display, on the touch panel display, a second user interface that receives an input of information for personal authentication about the purchaser in response to acquisition of the purchaser identification information.

5. The image identification register apparatus according to claim 1, wherein the one or more processors are further configured to execute the instructions to display, on the touch panel display, a user interface including an identification result of a product as a third user interface.

6. The image identification register apparatus according to claim 5, wherein when a plurality of products are identified as candidates, the one or more processors are further configured to execute the instructions to display, on the touch panel display, a user interface for selecting any of the plurality of products as the third user interface.

7. The image identification register apparatus according to claim 1, wherein the one or more processors are further configured to execute the instructions to display, on the touch panel display, a fourth user interface for correcting an identification result of the product identification unit to be displayed on a product.

8. The image identification register apparatus according to claim 1, wherein the one or more processors are further configured to execute the instructions to display, on the touch panel display, a fifth user interface for canceling a purchase of the product.

9. The image identification register apparatus according to claim 1, wherein the one or more processors are further configured to execute the instructions to:

display, on the touch panel display a sixth user interface for acquiring a track of a pointing object on the touch panel display; and execute processing associated with the track of the pointing object being acquired by the sixth user interface.

10. The image identification register apparatus according to claim 1, wherein the one or more processors are further configured to execute the instructions to determine a display position of the user interface based on a position of the product placed on the touch panel display.

11. An image identification register system, comprising:

a touch panel display used as a placement surface of a product;

an image capturing apparatus that captures the product, and generates an image of the product;

a memory storing instructions; and one or more processors configured to execute instructions to:

identify, by machine learning comprising pattern matching and a discriminator, the product placed on the touch panel display and captured in the image;

display, on the touch panel display, a user interface that receives user inputs on the touch panel display and needed for checkout processing of the product, according to an identification result of the product, the user interface including a registering interface configured to receive an operation comprising at least one of the user inputs as an input registering the product as a product to be purchased; and execute unit that executes processing based on an input to the user interface, wherein the one or more processors are further configured to execute the instructions to:

output, on the touch panel display, a mark indicating an identified product based on a position of the identified product; and change appearance of the mark when the identified product is registered as a product to be purchased by the operation of the registering interface displayed on the touch panel display on which the product is placed, wherein the user interface further comprises a plurality of registering interfaces, including the registering interface, each respective to ones of a plurality of products, including the product, placed on the touch panel display, wherein each of the registering interfaces comprises, for each of the products, a register interface button, a correct interface button, and a cancel interface button, wherein operating the register interface button confirms whether to proceed with a purchase of at least one of the products, wherein operating the correct interface button operates to correct identification of at least one of the products, and wherein operating the cancel interface button operates to cancel a purchase operation of at least one of the products.

12. An checkout processing method executed by a computer comprising:

acquiring an image of a product placed on a touch panel display;

identifying, by machine learning comprising pattern matching and a discriminator, the product placed on the touch panel display and captured in the image;

displaying, on the touch panel display, a user interface that receives user inputs on the touch panel display and needed for checkout processing of the product, according to an identification result of the product, the user interface including a registering interface configured to receive an operation comprising at least one of the user inputs as an input registering the product as a product to be purchased; and executing processing based on an input to the user interface, wherein the method further comprises:

outputting, on the touch panel display, a mark indicating an identified product based on a position of the identified product; and changing appearance of the mark when the identified product is registered as a product to be purchased by the operation of the registering interface displayed on the touch panel display on which the product is placed, wherein the user interface further comprises a plurality of registering interfaces, including the registering interface, each respective to ones of a plurality of products, including the product, placed on the touch panel display, wherein each of the registering interfaces comprises, for each of the products, a register interface button, a correct interface button, and a cancel interface button, wherein operating the register interface button confirms whether to proceed with a purchase of at least one of the products, wherein operating the correct interface button operates to correct identification of at least one of the products, and wherein operating the cancel interface button operates to cancel a purchase operation of at least one of the products.

* * * * *